(12) United States Patent
Cottrell (10) Patent No.: US 6,575,678 B2
(45) Date of Patent: Jun. 10, 2003

(54) LOCKING CYLINDER

(75) Inventor: D. Michael Cottrell, Gainesville, GA (US)

(73) Assignee: Cottrell, Inc., Gainesville, GA (US)

( * ) Notice: Subject to any disclaimer, the term of this patent is extended or adjusted under 35 U.S.C. 154(b) by 0 days.

(21) Appl. No.: 09/921,422

(22) Filed: Aug. 2, 2001

(65) Prior Publication Data

US 2002/0051692 A1 May 2, 2002

Related U.S. Application Data (60) Provisional application No. 60/243,563, filed on Oct. 26, 2000.

(51) Int. Cl.[7] .............................. F15B 15/26; B60P 3/08
(52) U.S. Cl. .......................................... 410/29.1; 92/17
(58) Field of Search ......................... 91/44; 92/17, 18, 92/24; 410/29.1

(56) References Cited

U.S. PATENT DOCUMENTS

| | | | | |
|---|---|---|---|---|
| 2,801,615 A | * | 8/1957 | Geyer | 91/417 R |
| 2,804,053 A | * | 8/1957 | Geyer | 92/17 |
| 2,886,008 A | * | 5/1959 | Geyer et al. | 91/45 |
| 2,970,573 A | * | 2/1961 | Geyer | 92/17 |
| 3,003,470 A | * | 10/1961 | Geyer | 92/17 |
| 3,785,249 A | * | 1/1974 | Piroska | 91/41 |
| 4,076,208 A | * | 2/1978 | Olson | 251/1.3 |
| 4,822,222 A | | 4/1989 | Zeuner et al. | 410/29.1 |
| 5,332,345 A | | 7/1994 | Lillard | 410/29.1 |
| 5,755,540 A | | 5/1998 | Bushnell | 410/29.1 |
| 5,836,730 A | | 11/1998 | Boydstun, IV | 410/12 |
| 5,938,382 A | | 8/1999 | Andre et al. | 410/24 |

* cited by examiner

Primary Examiner—D. Glenn Daydan
Assistant Examiner—Paul Chenevert
(74) Attorney, Agent, or Firm—Hinkle & O'Bradovich, LLC

(57) ABSTRACT

A hydraulic cylinder having an integral self-contained locking mechanism is described. A locking cylinder includes a housing that contains a screw shaft and a rod/piston assembly. A rod end of the rod/piston assembly can be connected to one load and the end cap, which is located opposite to the rod end, can be connected to another load. The two loads may be two levels of a car trailer. During an extension stroke the screw shaft is released from a locking mechanism inside the housing, allowing the screw shaft to rotate freely. The rod piston assembly, which is in threaded engagement with the screw shaft, moves freely along a longitudinal axis as a pressure is applied, and it unscrews from the screw shaft. When the assembly reaches a desired or maximum extension, the pressure is removed. The piston retracts slightly until the screw shaft re-engages with the locking mechanism. During a retraction stroke a pressure releases the screw shaft from the locking mechanism, maintains it in the unlocked position and allows the screw shaft to rotate freely. In this motion, the assembly screws onto the screw shaft thereby retracting the locking cylinder.

14 Claims, 10 Drawing Sheets

Fig_1C

Fig_6A

Fig_6B

LOCKING CYLINDER

CROSS-REFERENCE TO RELATED APPLICATIONS

This application claims the priority benefit of U.S. Provisional Application No. 60/243,563 filed Oct., 26, 2000, entitled "Locking Cylinder".

BACKGROUND OF THE INVENTION

I. Field of the Invention

The present invention relates generally to the field of hydraulic cylinders and more particularly to a self-locking hydraulic cylinder apparatus.

II. Description of the Related Art

Currently, if a load is to be lifted and secured by a hydraulic cylinder, there must exist an external locking mechanism or an internal/external hydraulic valve to hold the load in place. Mechanical locks require additional components and usually only lock the load in distinct increments. Hydraulic valves drift down over a period of time due to possible seal or spool leakage. Furthermore, in case of hydraulic fluid pressure failure, there must be a mechanism to prevent the lowering of a load.

Figure 3:
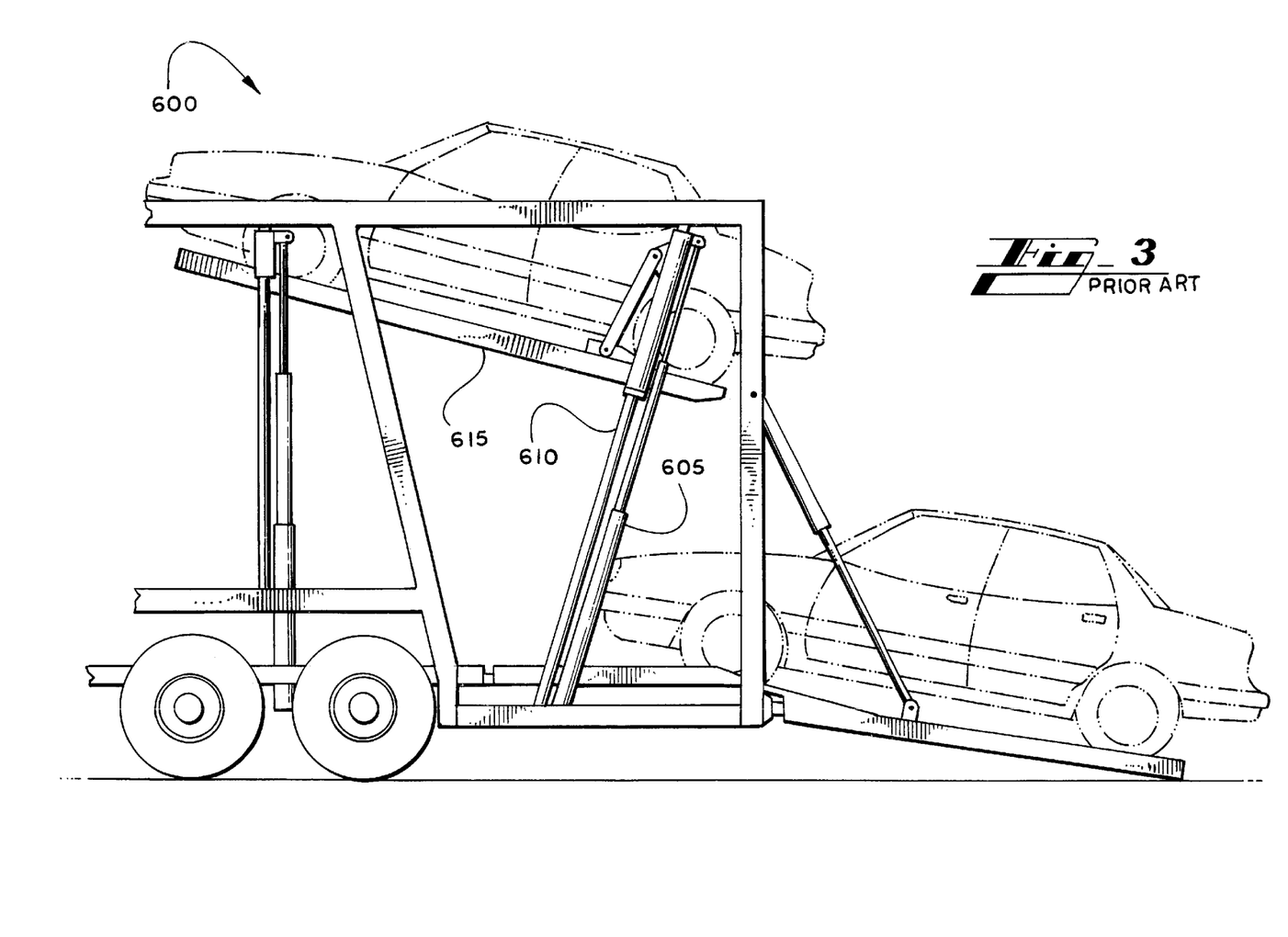
FIG. 3 (Prior Art) illustrates a portion of a vehicle carrier.

FIG. 3 illustrates a car trailer 600 having a prior art cylinder assembly. Two hydraulic cylinders 605, 610 can raise or lower a car level 615. This double cylinder configuration can be used to prevent the level 615 from lowering as it might if just one cylinder were used to raise it.

Figure 4A:
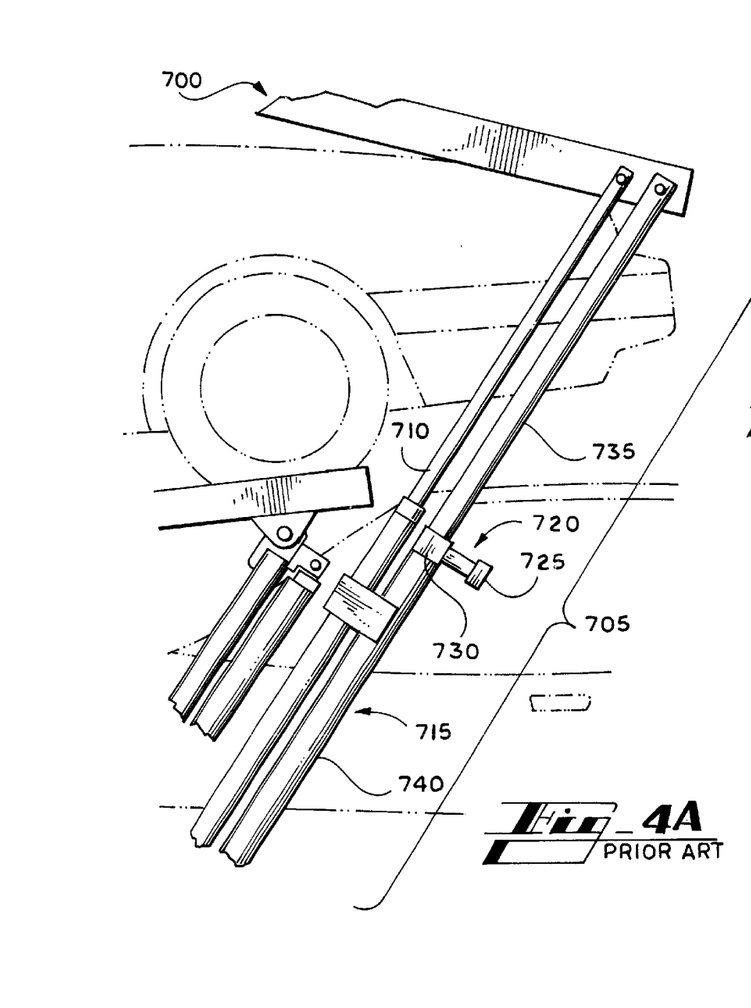
FIG. 4A (Prior Art) illustrates a portion of a vehicle carrier.

FIG. 4A illustrates a car trailer having a prior art hydraulic cylinder assembly 705. A hydraulic cylinder 710 can be pressurized with hydraulic fluid to extend and retract levels of the car trailer 700. An additional mechanical cylinder 715 is used to set the levels in place after the hydraulic cylinder 710 raises or lowers the levels. A mechanical device 720 is used on the mechanical cylinder as a setting device. A set screw 725 is used to tighten a cuff 730 around a rod 735 to keep the rod 735 from retracting into a housing 740. Alternatively, the device 720 is a spring loaded set pin (not shown) that inserts into a hole on the rod 735. Having this mechanical setting keeps the levels in place if the hydraulic cylinder 710 begins to retract for any reason such as fluid leakage.

Figure 4B:
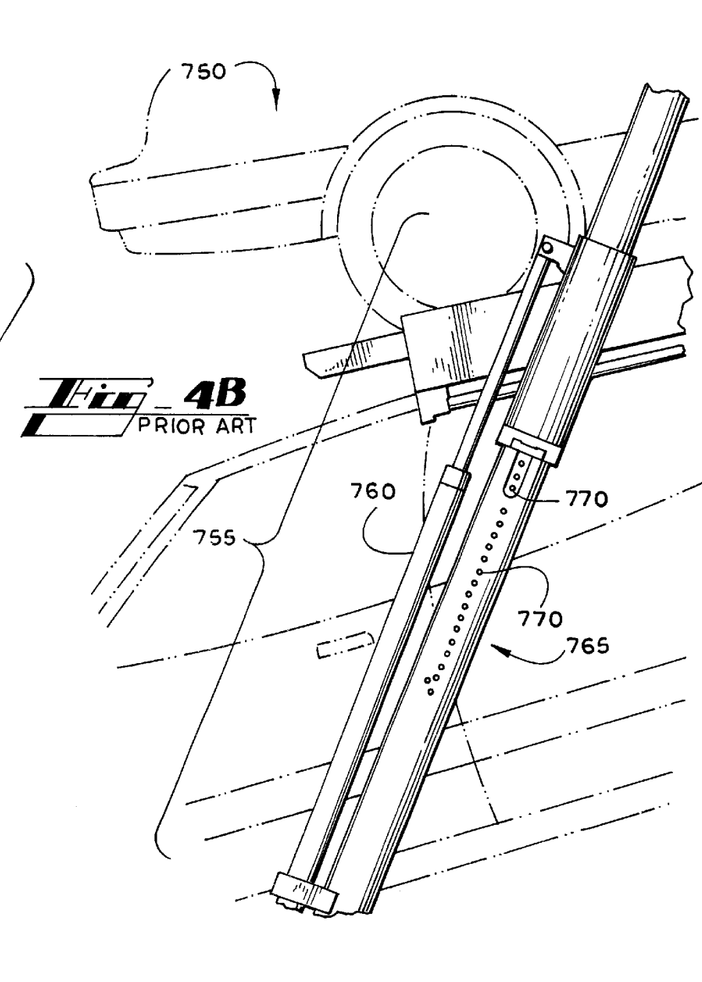
FIG. 4B (Prior Art) illustrates a portion of a vehicle carrier.

FIG. 4B illustrates a car trailer 750 having a prior art hydraulic cylinder assembly 755. A hydraulic cylinder 760 can be pressurized with hydraulic fluid to extend and retract levels of the car trailer 750. An additional mechanical cylinder 765 is used to set the levels in place after the hydraulic cylinder 760 raises or lowers the levels. The mechanical cylinder 765 has a series of pinholes 770 that are adapted to receive a set pin (not shown). Once the hydraulic cylinder raises or lowers the levels to the desired position, the set pin can be placed in one of the holes 770 to keep the hydraulic cylinder from retracting.

Each of these prior art assemblies requires an external mechanical mechanism that typically has to be set by a human in order to set the hydraulic cylinder in place.

SUMMARY OF THE INVENTION

In accordance with the present invention and the contemplated problems which have and continue to exist in this field, the invention features a hydraulic locking cylinder having an integral self-contained locking mechanism. The locking cylinder holds a load imposed on the cylinder without any external mechanism and without additional hydraulic valves or interaction. It holds the load indefinitely without drifting down. In particular embodiments, the cylinder is hydraulically operated and forces hydraulic fluid in and out of three separate ports as selected and needed. In another embodiment, the cylinder is hydraulically operated and forces hydraulic fluid in and out of two ports using a shuttle valve to direct and redirect the fluid. The cylinder uses a continuous screw that extends the length of the hydraulic cylinder and is turned by the input of hydraulic fluid in the various hydraulic ports. As the cylinder extends and retracts, the screw turns. A self locking feature includes an internal locking rod that engages a notch on the head of the screw. The engagement and disengagement of the screw depends on the force caused by the input of hydraulic fluid into the ports as well as the force of the load, typically a gravitational force.

One advantage of the invention is that the cylinder is self-contained and needs no additional external mechanisms to lock.

Another advantage is that in the event of hydraulic fluid pressure failure, the cylinder locks at substantially the same point at which the pressure is removed.

In one aspect, the invention features a locking cylinder, including a screw shaft having a head and a threaded rod, wherein the head has a radius larger than the rod, the head having a top surface, a nut in threaded engagement with the threaded rod, a piston, having a hollow center, connected to the nut, the piston being adapted to receive the threaded rod when the nut screws onto the screw shaft, a substantially cylindrical rod, with one end connected to the piston, wherein the screw shaft, the nut, the piston, and the rod share a longitudinal axis, wherein the top surface of the head is substantially perpendicular to the longitudinal axis, a generally cylindrical housing surrounding the screw shaft, the nut, the piston and the rod, wherein the rod extends out of one end the housing along the longitudinal axis, wherein the longitudinal axis of the housing is the same as the longitudinal axis.

In an implementation, one end of the housing has an inner wall with a radius substantially the same as a radius of the rod, and wherein an elongated portion of the center of the housing has an inner wall with a radius substantially the same as a radius of the piston, and wherein the other end of the housing has an inner wall with a radius substantially the same as the head of the screw shaft.

In another implementation, the perimeter of the head of the screw shaft is in contact with the inner wall of the housing having the radius the same as the head, and wherein the perimeter of the piston is in contact with the inner wall of the housing having the same radius as the piston, and wherein the perimeter of the rod is in contact with the inner wall of the housing having the same radius as the rod.

In still another implementation, the cylinder includes a first seal in the inner wall of the housing having the same radius as the head, the seal running along the perimeter of the head, and in contact with the head, a second seal running along the perimeter of the piston and in contact with the inner wall having the same radius as the piston and a third seal in the inner wall of the housing having the same radius as the rod, the third seal running along the perimeter of the rod, and in contact with the rod.

In yet another implementation, the end of the housing opposite the end of the housing having the rod extending from it, has a closure, the closure having an inner wall internal to the housing, and substantially perpendicular to the longitudinal axis and the inner wall of the closure faces the top surface of the head.

In another implementation, the top surface of the head further comprises a notch at a location on the surface less than the radius of the head.

In another implementation, the cylinder further includes a locking rod substantially connected to the inner wall of the closure and perpendicular to the inner wall of the closure, the locking rod adapted to engage the notch.

In another aspect, the invention features a hydraulic cylinder including a substantially cylindrical housing having a longitudinal axis and a first and second end, the first end having a inner face and an outer face, the inner and outer faces being substantially perpendicular to the longitudinal axis, and the second end having an opening defined by a plane substantially perpendicular to the longitudinal axis, a screw shaft having a substantially cylindrical head portion having a first radius, a substantially cylindrical threaded portion having a second radius, the threaded portion being substantially perpendicular with a geometric cross section of the head portion, wherein the head portion and the threaded portion have a longitudinal axis common with the longitudinal axis of the housing, and wherein the geometric cross section is substantially perpendicular with the common longitudinal axes and a rod having a substantially cylindrical ball nut having a first and second open end, and an inner and outer surface, the inner surface being threaded and adapted to engage the threaded portion of the screw shaft, a substantially cylindrical piston having a first end and a second end, the first end being connected to one of the ball nut ends, an end portion connected to the second end of the piston, wherein the end portion intersects the opening defined by the plane on the second end of the housing, wherein the ball nut, the piston and the end portion have a longitudinal axis common with the longitudinal axis of the housing.

In an implementation, the cylinder includes a locking rod substantially perpendicular to the inner face of the first end of the housing.

In another implementation the cylinder includes hydraulic fluid inputs.

In still another aspect, the invention features a vehicle transporter, including a plurality of vehicle platforms, each having a plurality of hydraulic cylinders to lift and position the platforms, the cylinders including a substantially cylindrical housing having a longitudinal axis and a first and second end, the first end having a inner face and an outer face, the inner and outer faces being substantially perpendicular to the longitudinal axis, and the second end having an opening defined by a plane substantially perpendicular to the longitudinal axis, a screw shaft having a substantially cylindrical head portion having a first radius, a substantially cylindrical threaded portion having a second radius, the threaded portion being substantially perpendicular with a geometric cross section of the head portion, wherein the head portion and the threaded portion have a longitudinal axis common with the longitudinal axis of the housing, and wherein the geometric cross section is substantially perpendicular with the common longitudinal axes, a rod having a substantially cylindrical ball nut having a first and second open end, and an inner and outer surface, the inner surface being threaded and adapted to engage the threaded portion of the screw shaft, a substantially cylindrical piston having a first end and a second end, the first end being connected to one of the ball nut ends, an end portion connected to the second end of the piston, wherein the end portion intersects the opening defined by the plane on the second end of the housing, wherein the ball nut, the piston and the end portion have a longitudinal axis common with the longitudinal axis of the housing and a locking rod substantially perpendicular to the inner face of the first end of the housing.

In still another aspect, the invention features a locking cylinder, including a screw shaft having a head and a threaded rod, wherein the head has a radius larger than the rod, the head having a circumferential surface, a piston having a hollow center and internal threads, the piston adapted to receive the threaded rod when the internal threads screw onto the screw shaft, a substantially cylindrical rod, with one end connected to the piston, wherein the screw shaft, the piston, and the rod share a longitudinal axis, a generally cylindrical housing surrounding the screw shaft, the piston and the rod, wherein the rod extends out of one end the housing along the longitudinal axis, wherein the longitudinal axis of the housing is the same as the longitudinal axis.

In an implementation, the cylinder further includes a casing connected to the housing and enclosing the head of the screw shaft, the casing including a plunger enclosed within a chamber within the casing and oriented substantially perpendicular to the longitudinal axis and to a portion of the circumferential surface, a first end of the plunger in proximity of the circumferential surface and a spring coupled to a second end of the plunger.

In still another implementation, the circumferential surface includes at least one engagement notch oriented radially outward from the circumferential surface, wherein the notch is adapted to receive the first end of the plunger.

In another implementation, the cylinder includes hydraulic fluid inputs.

In yet another implementation, the casing further includes a shuttle valve assembly having hydraulic fluid inputs, the assembly adapted to route hydraulic fluid to different sections of the housing and to the portion of the casing having the plunger.

In still another implementation, the casing further includes a hydraulic fluid input adapted to route fluid to the portion of the casing having the plunger.

In yet another aspect, the invention features a vehicle transporter, comprising a plurality of vehicle platforms, each having a plurality of hydraulic cylinders to lift and position the platforms, the cylinders including a screw shaft having a head and a threaded rod, wherein the head has a radius larger than the rod, the head having a circumferential surface, a piston, having a hollow center and internal threads, the piston being adapted to receive the threaded rod when the internal threads screw onto the screw shaft, a substantially cylindrical rod, with one end connected to the piston, wherein the screw shaft, the piston, and the rod share a longitudinal axis, a generally cylindrical housing surrounding the screw shaft, the piston and the rod, wherein the rod extends out of one end the housing along the longitudinal axis, wherein the longitudinal axis of the housing is the same as the longitudinal axis and a casing connected to the housing and enclosing the head of the screw shaft, the casing including a plunger enclosed within a chamber within the casing and oriented substantially perpendicular to the longitudinal axis and to a portion of the circumferential surface, a first end of the plunger in proximity of the circumferential surface and a spring coupled to a second end of the plunger, wherein the circumferential surface includes at least one engagement notch oriented radially outward from the circumferential surface, wherein the notch is adapted to receive the first end of the plunger.

In another aspect, the invention features hydraulic locking cylinder, including a housing enclosing a rod and piston assembly in threaded engagement with a screw shaft and means for locking the screw shaft thereby preventing rotation of the screw shaft.

Other objects, advantages and capabilities of the invention will become apparent from the following description taken in conjunction with the accompanying drawings showing the preferred embodiment of the invention.

DETAILED DESCRIPTION OF THE INVENTION

In general a locking cylinder includes a rod and piston assembly in threaded engagement with a screw shaft all enclosed by a housing. The housing typically includes a locking feature which prevents the screw shaft from rotating thereby preventing the rod and piston assembly from translating within the housing. Several embodiments for a locking cylinder are now discussed in detail.

A First Embodiment

Figure 1A:
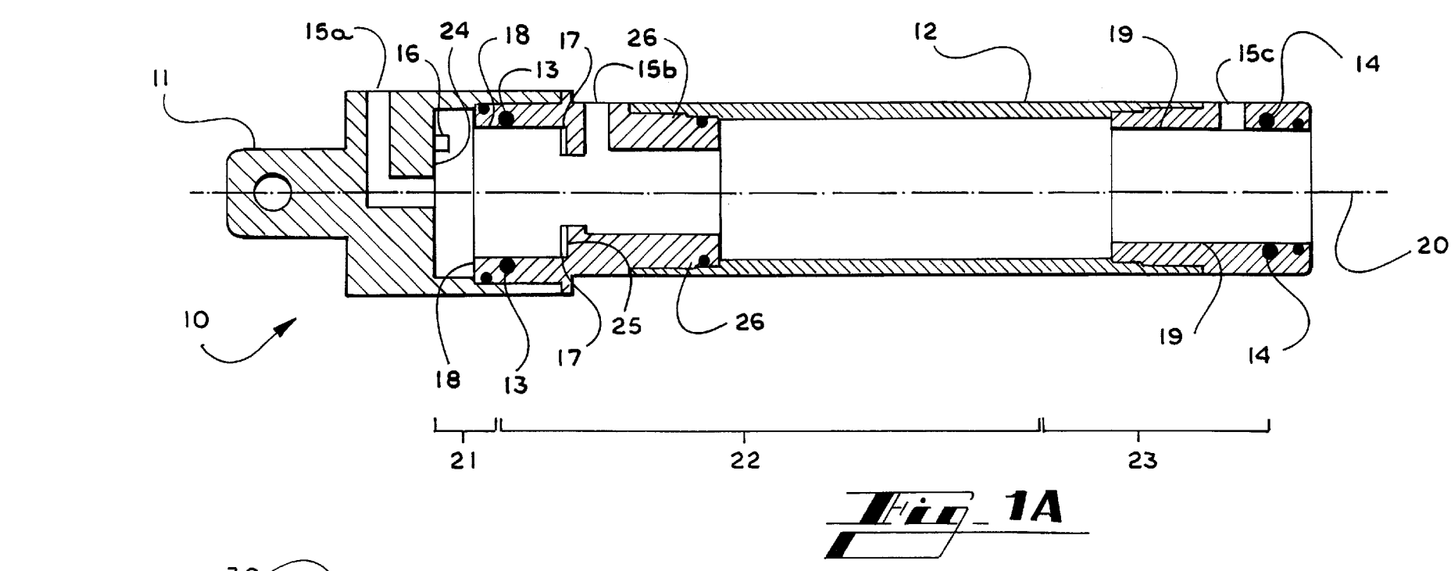
FIG. 1A illustrates an embodiment of a locking cylinder housing.

Referring to the drawings wherein like reference numerals designate corresponding parts throughout the several figures, reference is made first to FIG. 1A that illustrates an embodiment of a locking cylinder housing 10 which has a substantially cylindrical shape and substantially circular cross section. The housing 10 has a longitudinal axis 20. The housing 10 includes an end cap 11 adapted to connect one end of the locking cylinder 10 to a load. An example of a load is one level of a car trailer. A car trailer can have numerous levels to store cars for transport. Several locking cylinders can be used to bring together and separate the different levels of a car trailer.

An outer tubing 12 is the substantial enclosure of the housing 10. A seal 13 is included in an inner wall 18 of the housing 10. A locking rod 16 is located on an interior wall 24 of the housing 10. A thrust bearing 17 generally covers an interior wall 25 of the housing 10. A packing nut 14 is included in a piston-stop wall 19 of the housing 10. Located in opposition to the piston-stop wall 19 is a nut-stop wall 26. The interior of the housing 10 can be categorized into three pressure chambers ("chambers") 21, 22, 23. The chamber 21 is of fixed length along the longitudinal axis 20. The chamber 21 is defined between inner wall 24 and the seal 13. The lengths of chambers 22, 23 can vary in length and is discussed in detail below. Three hydraulic fluid ports 15a, 15b, 15c are positioned on one side of the housing 10. Generally, port 15a provides hydraulic fluid to chamber 21, port 15b provides hydraulic fluid to chamber 22 and port 15c provides hydraulic fluid to chamber 23.

Figure 1B:
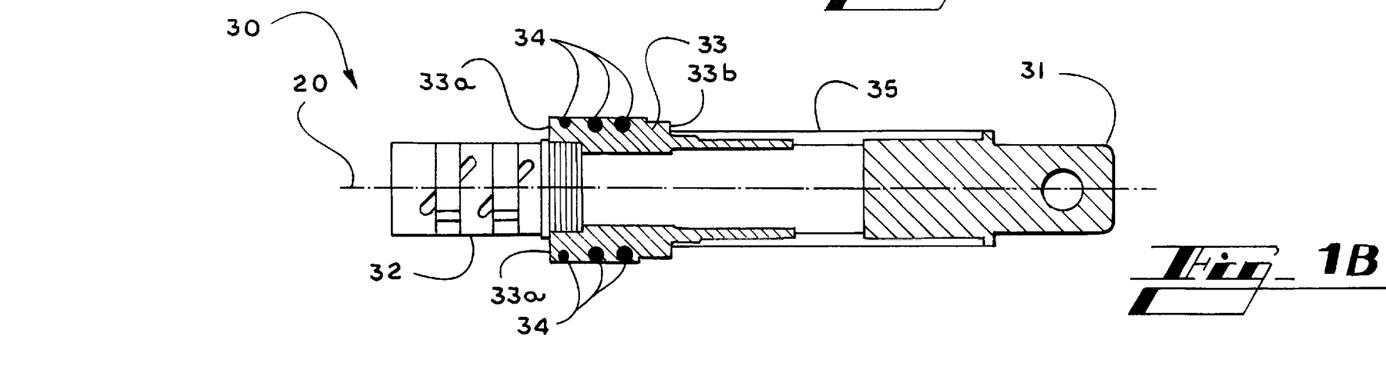
FIG. 1B illustrates an embodiment of a rod/piston assembly.

FIG. 1B illustrates an embodiment of a rod/piston assembly 30. The assembly 30 is substantially cylindrical and has a substantially circular cross section. The assembly 30 includes a rod end 31 adapted to connect one end of the locking cylinder. For example, as discussed above, the end cap 11 connects one end of the locking cylinder. The rod end 31 connects the other end of the locking cylinder to a load. A hollow tube 35 is connected to the rod end 31. A piston 33 is connected to the other end of the hollow tube 35. The piston 33 includes one or more seals 34 that are connected to an outer perimeter of the piston 33. The piston 33 is adapted to receive a force from a fluid pressure on piston walls 33a, 33b. A nut 32 is connected to the piston 33. The nut 32 is generally cylindrical and includes inner threads (not shown). The assembly 30 shares a common longitudinal axis 20 with the housing 10.

Figure 1C:
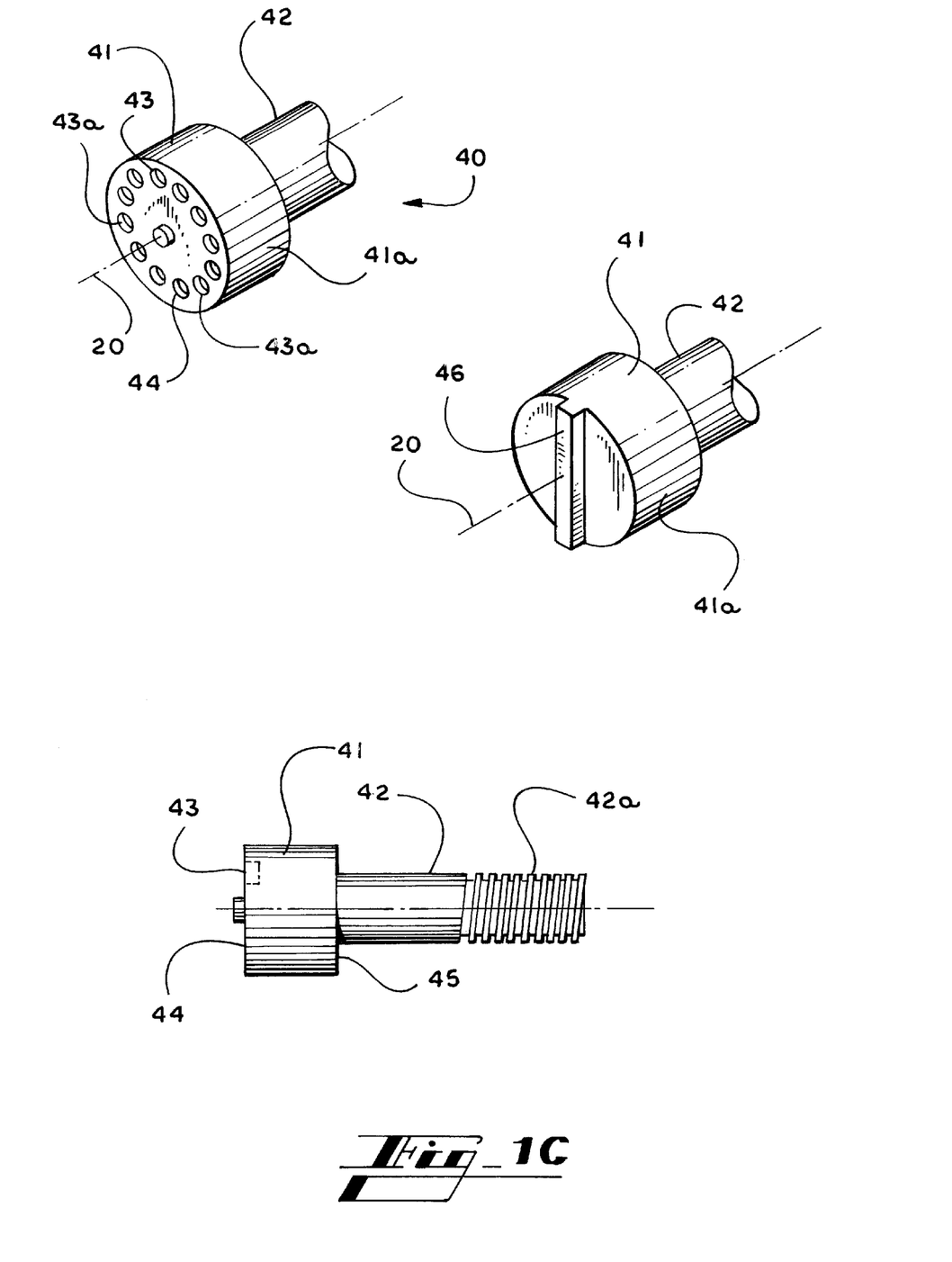
FIG. 1C illustrates an embodiment of a screw shaft.

FIG. 1C illustrates an embodiment of a screw shaft 40. The screw shaft 40 includes a stub end 41 and a threaded portion 42. The stub end 41 has a substantially circular perimeter 41a. The threaded portion 42 can contain threads 42a along the entire length or only part of the portion 42. The figure illustrates that the threads cover about one half of the threaded portion 42. A locking rod engagement notch 43 is located on a face 44 of the stub end 41. A bearing face 45 is located opposite the face 44. The screw shaft 40 shares a longitudinal axis 20 with the housing 10 and the assembly 30. In another embodiment, additional notches 43a can be included on the face 44, located at the same radial locations as notch 43. The notches 43, 43a are generally oriented parallel to the longitudinal axis 20. In another embodiment, the face 44 can include a substantially rectangular protrusion 46 along a portion or all of the diameter of the face 44.

Figures 2A, 2B:
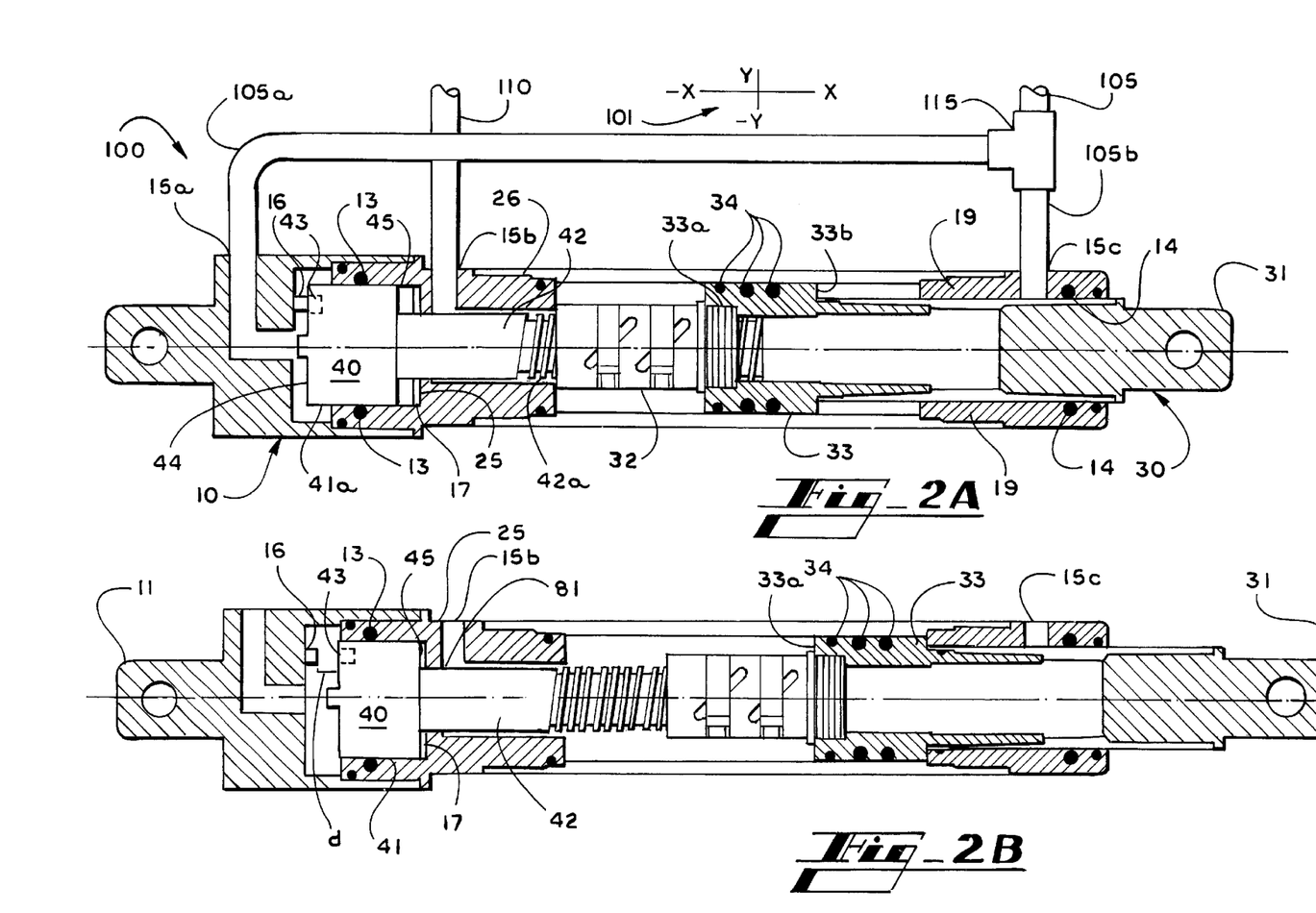
FIG. 2A illustrates an embodiment of a locking cylinder showing the rod/piston assembly and screw shaft in one orientation.
FIG. 2B illustrates an embodiment of a locking cylinder showing the rod/piston assembly and screw shaft in another orientation.

FIG. 2A illustrates one embodiment of a locking cylinder 100. A Cartesian coordinate system 101 is provided for simplicity of discussion. The cylinder 100 is illustrated as a fixed length. The cylinder 100 can be different lengths depending on the implementation of the cylinder 100. For example, in the car trailer discussed above, several locking cylinders of varying lengths can be used to separate a number of levels of the car trailer. The locking cylinder includes the housing 10 the assembly 30 and the screw shaft 40. The stub end 41 of the screw shaft 40 is located generally in a portion of chamber 21 and is adapted to move along the longitudinal axis 20. Generally, the movements of screw shaft 40 are small compared to the overall movements of the locking cylinder 100 and to the movements of the assembly 30 as discussed in detail below. The seal 13 mechanically engages the outer perimeter 41*a* of the stub end 41. The seal 13 completely surrounds the outer perimeter 41*a*. The mechanical engagement between the seal 13 and the perimeter 41*a* provides isolation between the chambers 21, 22 so that the respective pressures caused by the input of hydraulic fluid through the ports 15*a*, 15*b* in the chambers 21, 22, respectively, are maintained. During typical operation of the locking cylinder a pressure differential between the chambers 21, 22 is maintained. The seal 13 helps to maintain this pressure differential by preventing fluid leakage between the chambers 21, 22.

The notch 43 is adapted to engage the locking rod 16. Since the stub end 41 is adapted to rotate about the axis 20, there are several positions in which the notch 43 is not able to engage the locking rod 16. As the screw shaft 40 rotates during the operation of the cylinder 100, there is one position in which the locking rod 16 and the notch 43 face each other in opposition and are able to engage. In another embodiment in which additional notches 43*a* are added, there are several positions in which the locking rod is able to engage the notch 43 or the notches 43*a*. Bearing face 45 is adapted to engage the thrust bearing 17.

The threaded portion 42 of the screw shaft 40 is generally located in chamber 22. The threads 42*a* mechanically engage the inner threads of nut 32 on assembly 30. The seals 34 mechanically engage with the inner wall of outer tubing 12 to form an isolation between chambers 22, 23. Chamber 22 is generally formed between seal 13 and seals 34. Chamber 23 is generally formed between seals 34 and packing nut 14. Therefore, the lengths of the chambers 22, 23 along the axis 20 vary with respect to each other.

The assembly 30 is adapted to move along the longitudinal axis 20. When the screw shaft 40 rotates about the axis 20, the threaded portion 42 screws with respect to the nut 32. For purposes of this discussion it is assumed that the locking rod 16 is not engaged with the notch 43 so that the screw shaft 40 rotates freely. In one direction of rotation, the assembly 30 moves along the axis 20 in the −x direction. The movement can continue until the nut 32 engages the nut stop 26. As the assembly 30 moves in the −x direction, the threaded portion 42 moves into the hollow tube 35. The inner wall of the hollow tube 35 is typically not threaded and is adapted to receive the threaded portion 42 in its entirety during the operation of the locking cylinder 100.

In the opposite direction of rotation, the assembly 30 moves along the axis 20 in the x direction. The movement can continue until the piston engages piston stop wall 19.

The rod end 31 is adapted to extend and retract from the housing 10. As the assembly 30 moves along the −x direction, the rod end 31 retracts into the housing 10. When the nut 32 has engaged nut-stop wall 26, the rod end 31 is in the fully retracted position. However, the rod end 31 still protrudes from the housing 10 as the assembly 30 moves in the x direction, the rod end 31 extends from the housing 10 until the piston wall 33*b* engages the piston-stop wall 19. At this point the rod end 31 is in the fully extended position.

A hydraulic input pipe 105 provides hydraulic fluid to ports 15*a*, 15*c*. The hydraulic input pipe 105 shares a common intersection 115. This common intersection 115 keeps a constant flow and pressure of hydraulic fluid through pipes 105*a*, 105*b*, and therefore substantially the same pressure can be maintained in chambers 21, 23. Another input pipe 110 provides hydraulic fluid to port 15*b* and chamber 22.

As mentioned above, the locking cylinder 100 can be placed between two loads and be used to separate two loads. For example, two or more locking cylinders can be placed between two levels of a car trailer. The end cap can be connected to one level and the rod end connected to the other level. As the cylinder 100 is retracted and extended the levels are moved apart and closer together respectively.

Locking Cylinder Operation

Referring still to FIG. 1, the locking cylinder 100 operation is discussed. FIG. 2A illustrates the locking cylinder with no pressure applied at the ports 15*a*, 15*b*, 15*c*. The cylinder 100 is considered in the fully retracted and neutral position with the rod end 31 partially retracted into the cylinder housing 10. The locking rod 16 can be engaged with the notch 43, but in the neutral position it is possible that the rod 16 be flush with the face 44 of the screw shaft 30. Typically, it is desirable that the rod 16 be engaged with the notch 43 to prevent stray rotation of the screw aft 40.

Extension Stroke

FIG. 2B illustrates the locking cylinder 100 with fluid pressure applied at port 15*b*. The pressure is localized to chamber 22 between seals 13 and 34. This pressure in the chamber 22 creates a forces exerted on the interior walls of outer tubing 12 and on the screw shaft 40 and nut 32. The net forces on the screw shaft 40 and nut 32 cancel to cause a zero net motion. However, a net force is exerted on the piston wall 33*a* in the x direction. It is assumed that there is an opposing force in the −x direction due to a load connected to rod end 31, such as a load of cars. With no pressure exerted at input 15*c*, the pressure in chamber 23 is less than the pressure in chamber 22 thereby causing a net motion 20 of the assembly 30 along the axis 20 in the x direction. Furthermore, the screw shaft 40 is shifted slightly along the x direction when the assembly 30 initiates its motion. This shift clears the notch 43 from the locking rod 16 to approximately a distance d. The bearing wall 45 comes into contact with the bearing 17, which provides cushioning between the opposing wall 45 and wall 25. With the nut 32 and the threaded portion 42*a* in threaded engagement, a rotation of the screw shaft 40 occurs. This rotation allows the nut 32 to unscrew from the threaded portion 42*a*. As the nut 32 unscrews, the rod end 31 extends further and further from the housing 10. As the screw shaft 40 rotates, the bearing 17 decreases the friction that would be encountered if the walls 25 and 45 were in mechanical contact.

It is possible that there may be fluid leakage at space 81, located between interior wall 25 and threaded portion 42. The force on bearing face 45 caused by the fluid leakage is considered negligible compared to the force on piston wall 33*a*. In an embodiment, a seal can be added between wall 25 and threaded portion 42 to reduce leakage.

In an implementation of the locking cylinder 100, the extend stroke can be used to separate two levels of a car trailer. When the extend stroke is complete, either when the levels are set at the desired position or if the piston 33 comes into contact with piston-stop wall 19, which means that the cylinder 100 has reached maximum extension.

Self-Locking Feature

Figure 2C:
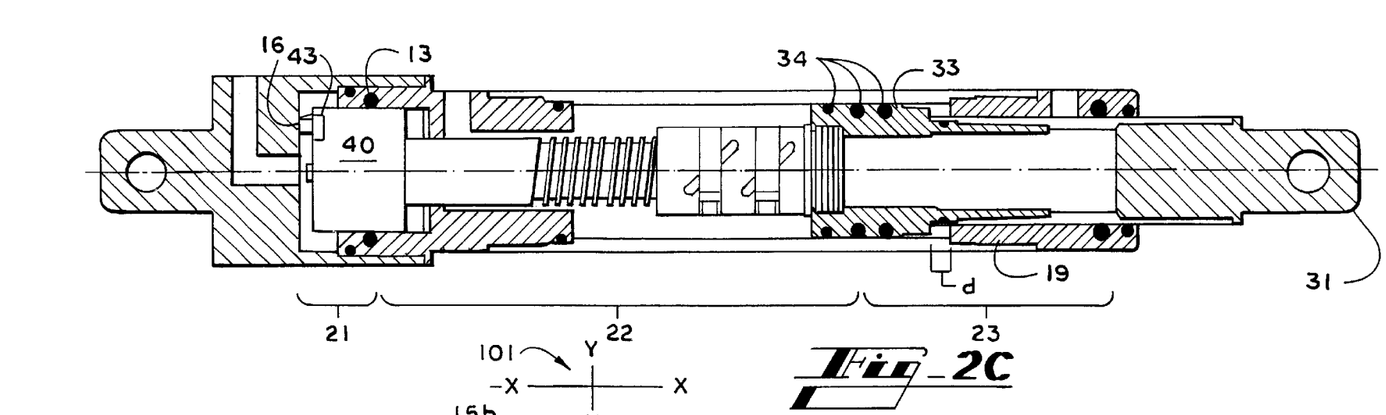
FIG. 2C illustrates an embodiment of a locking cylinder showing the rod/piston assembly and screw shaft in still another orientation.

FIG. 2C illustrates the locking cylinder 100 with no pressure applied at ports 15*a*, 15*b*, 15*c*. As the pressure is removed at input 15*b*, the force exerted on wall 33*a* is also removed. With a load exerting a force in the −x direction, the piston 33 gains a motion in the −x direction and the screw shaft 40 rotates in the opposite direction. Furthermore, the stub end 41 shifts slightly, under the force of the load and the walls 25, 45 disengage. The stub end face 44 shifts and comes into contact with locking rod 16. As the screw shaft 40 rotates the notch 43 eventually engages with locking rod 16. If there is only one notch 43, there can be almost a full rotation of the screw shaft 40 before the locking rod 16 engages the notch 43. In an embodiment where additional notches 43a are added, the rotation of the screw shaft 40 decreases because a notch 43a engages the locking rod 16 only after a partial rotation.

When the engagement between locking rod 16 and notch 43 occurs, the rotation of the screw shaft 40 ceases. At this point the locking cylinder holds virtually the same position that was attained during the extension stroke. Even in the event, that there is fluid leakage at the seals 13, 34 or at the packing nut 14, the engagement of the locking rod 16 and the notch 43 prevents the retraction (or further extension) of the rod end 31 onto the housing 10. In one embodiment, the distance between the stub end wall 44 and the locking rod is minimized to a distance d, so that when pressure is released from the extension stroke, the slight retraction is minimal. In another embodiment, the threaded portion 42a contains very tight threading so that the piston only retracts slightly when pressure is removed after the extension stroke. Ideally, the retraction distance is only a distance d, which can be measured between the piston 33 and the piston stop wall 19.

Retraction Stroke

Figure 2D:
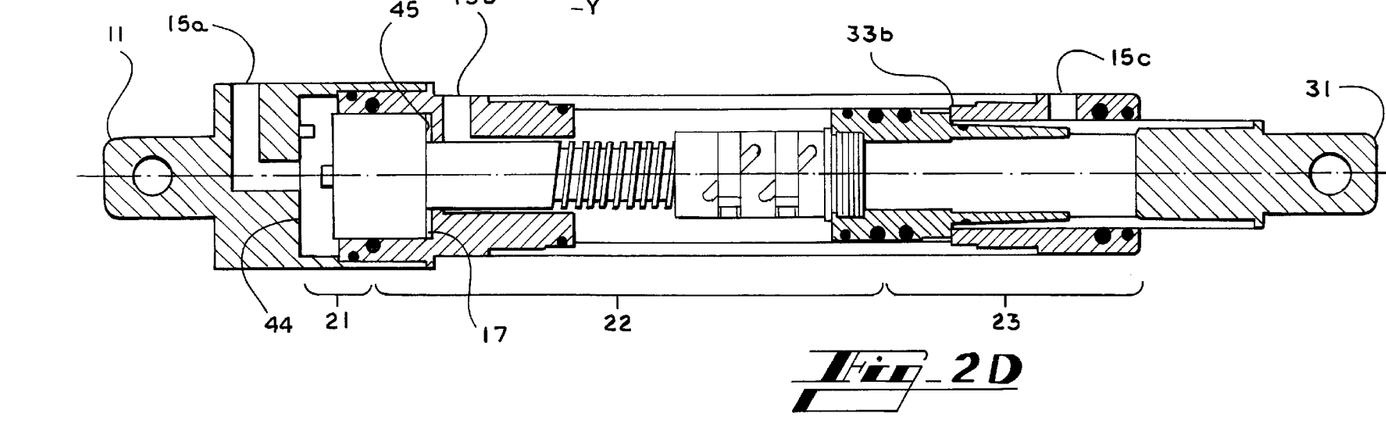
FIG. 2D illustrates an embodiment of a locking cylinder showing the rod/piston assembly and screw shaft in yet another orientation.

FIG. 2D illustrates the locking cylinder 100 with a pressure applied at ports 15a, 15c. As mentioned above, since pipes 105a and 105b share a common intersection 115, the pressure at ports 15a, 15c are substantially the same. Therefore, the pressures in chambers 21, 23 are virtually the same.

In general the force F on an area A under a pressure P is:

$$F = P * A$$

In order for the notch 43 to become disengaged from the locking rod 16, the force on stub end wall 44 must be greater than the force on piston wall 33b to create a slight shift of the screw shaft 40 in the x direction. In order to achieve this force differential, the surface area of piston wall 33b is less than the surface area of stub end wall 44. Therefore, when the common pressure is applied at ports 15a, 15c, the screw shaft 40 shifts in the x direction and bearing wall 45 comes into contact with bearing 17. As the pressure is maintained, the screw shaft 40 remains in this position. This releases the notch 43 from locking rod 16 and allows 4c the screw shaft 40 to rotate freely under an assumed load on rod end 31. As the screw shaft 40 rotates, the force on rod end 31 in the −x direction as well as the force exerted on piston wall 33b from the pressure at port 15c moves the assembly 30 in the −x direction. This motion allows the rod end 31 to partially retract into the housing 10, while keeping notch 43 free from locking rod 16. Therefore, it is important that a pressure be maintained in the chamber 21 to keep stub end 41 from shifting in the −x direction toward the locking rod 16, under the load on rod end 31. In an implementation, this retraction stroke can be used to move two levels of a car trailer closer together.

Figure 2E:
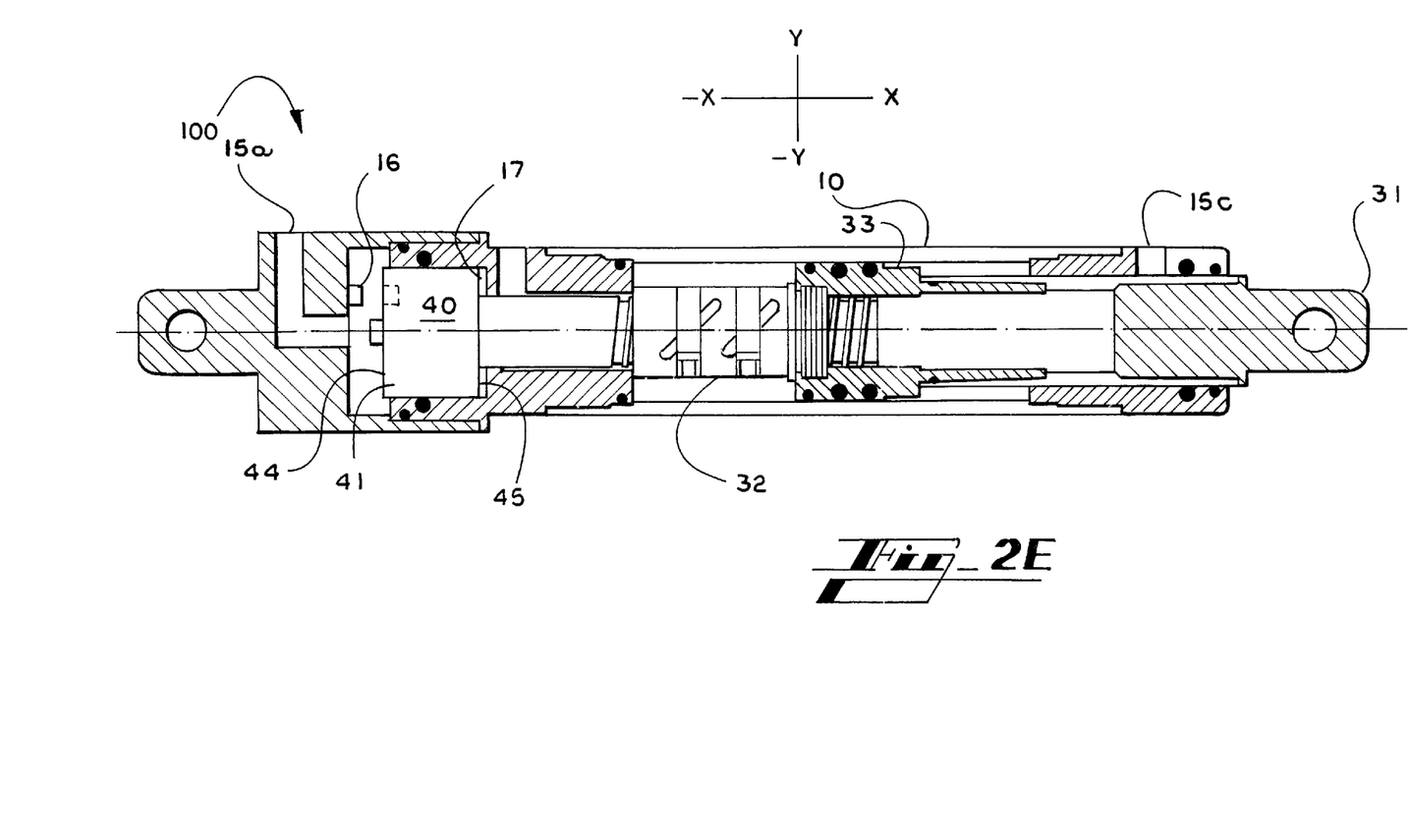
FIG. 2E illustrates an embodiment of a locking cylinder showing the rod/piston assembly and screw shaft in another orientation.

FIG. 2E illustrates the locking cylinder 100 in the fully retracted position. Rod end 31 partially is retracted into the housing 10. In this figure, pressure is still applied at ports 15a, 15c. With pressure still applied at the port 15a, a force is retained on the face 44 of stub end 41 keeping face 45 in contact with bearing 17. With pressure still applied at port 15c, the piston 33 also remains under pressure. The locking cylinder can remain in this state indefinitely. When pressure is removed from ports 15a, 15b, the stub end can be released until face 44 comes into contact with locking rod 16, depending on the position of piston 33. If the nut 32 is in contact with nut-stop wall 26, when the pressure is removed from ports 15a, 15c, the stub end 41 may not move at all until another extension stroke.

In the event of hydraulic pressure failure at any of the ports 15a, 15b, 15c at any point during the operation of the locking cylinder 100, the force of the load shifts the stub end 41 in the −x direction and as the screw shaft 40 screws onto nut 32, the notch 43 engages locking rod 16 thereby preventing the load from falling any further.

A Second Embodiment

Figure 5:
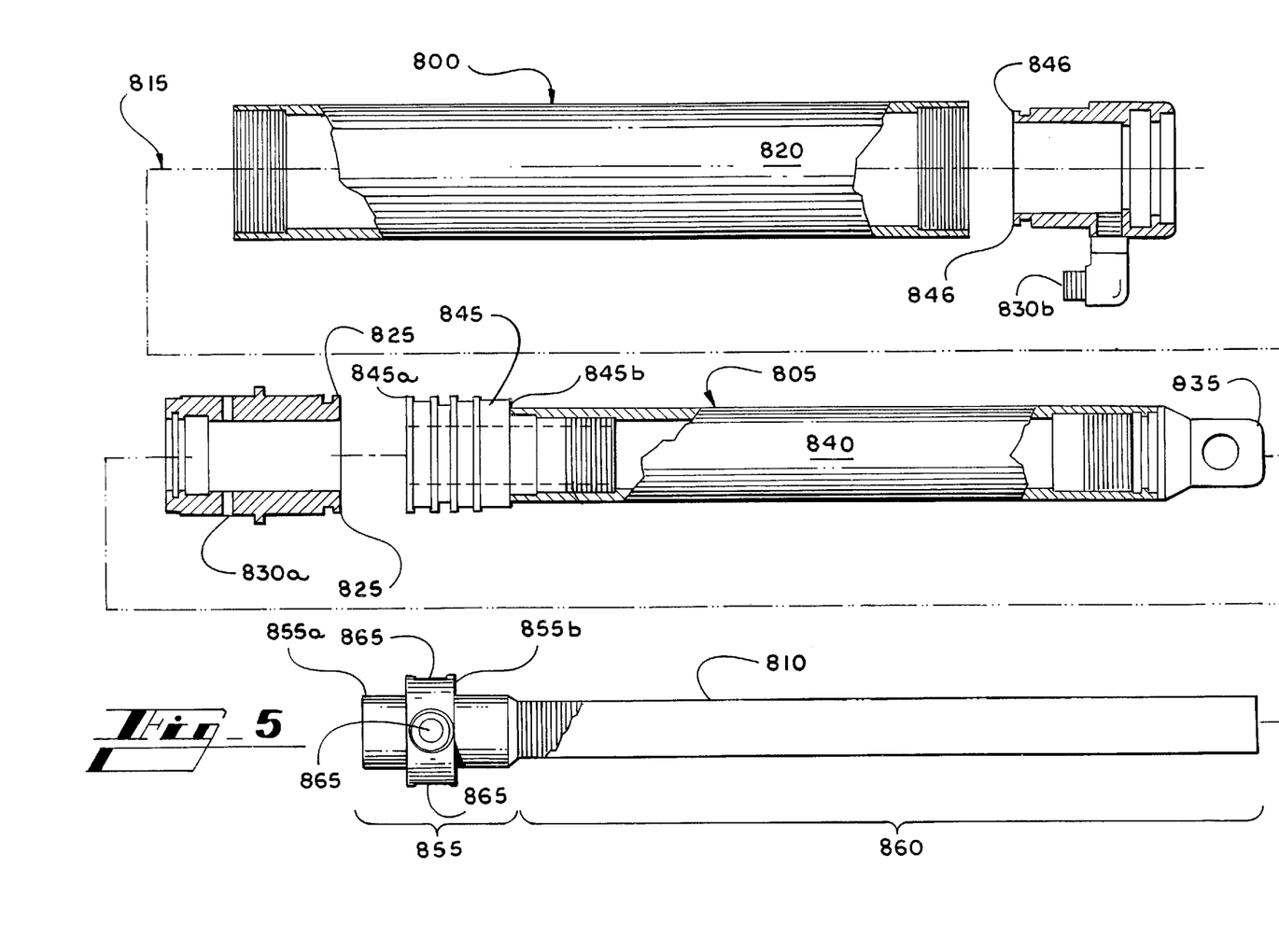
FIG. 5 illustrates an embodiment of a locking cylinder housing, a rod/piston assembly and a screw shaft.

FIG. 5 illustrates an embodiment of a locking cylinder housing 800, a rod/piston assembly 805 and a screw shaft 810. The housing 800 has a substantially cylindrical shape and substantially circular cross section. The housing 800 also has a longitudinal axis 815. An outer tubing 820 is the substantial enclosure of the housing 800. Details about bearings, packing nuts, o-rings and the like within the housing 800 have been omitted because the arrangements are similar to the above descriptions. Similar pressure chambers such as with the first embodiment are discussed in detail below. The housing 800 includes two nut-stop walls 825, 846.

Two hydraulic fluid ports 830a, 830b are positioned on one side of the housing 800. Generally, port 830a provides hydraulic fluid to one pressure chamber (discussed below) and port 830b provides hydraulic fluid to another pressure chamber (discussed below).

FIG. 5 also illustrates the rod/piston assembly 805. The assembly 805 is substantially cylindrical and has a substantially circular cross section. The assembly 805 includes a rod end 835 adapted to connect one end of the locking cylinder to, for example a load. As discussed in more detail above and below, an end cap connects the other end of the locking cylinder. A hollow tube 840 is connected to the rod end 835. A piston 845 is connected to the other end of the hollow tube 840. The piston 845 includes one or more seals that are connected to an outer perimeter of the piston 845. The piston 845 is adapted to receive a force from a fluid pressure on piston walls 845a, 845b. The piston includes inner threads (not shown) that are adapted to engage a threaded rod 860 (discussed below). It is understood that other portions or the entire interior of hollow tube 840 can be threaded. The assembly 805 shares a common longitudinal axis 815 with the housing 800.

FIG. 5 further illustrates a screw shaft 810. The screw shaft 810 includes a locking end 855 and a threaded rod 860. The locking end generally includes a first cylindrical portion 855a and an outer second cylindrical portion 855b. The second portion 855b generally has a larger radius than the first portion 855a. The second portion 855b also includes a plurality of engagement notches 865. The notches 865 are oriented substantially radially perpendicular to the longitudinal axis 815 (in which the screw shaft 810 shares with the housing 800 and the assembly 805 when all the pieces 800, 805 810 are assembled). The threaded rod 860 can contain threading along its entire length or only part of the portion of its length.

Figures 6A, 6B:
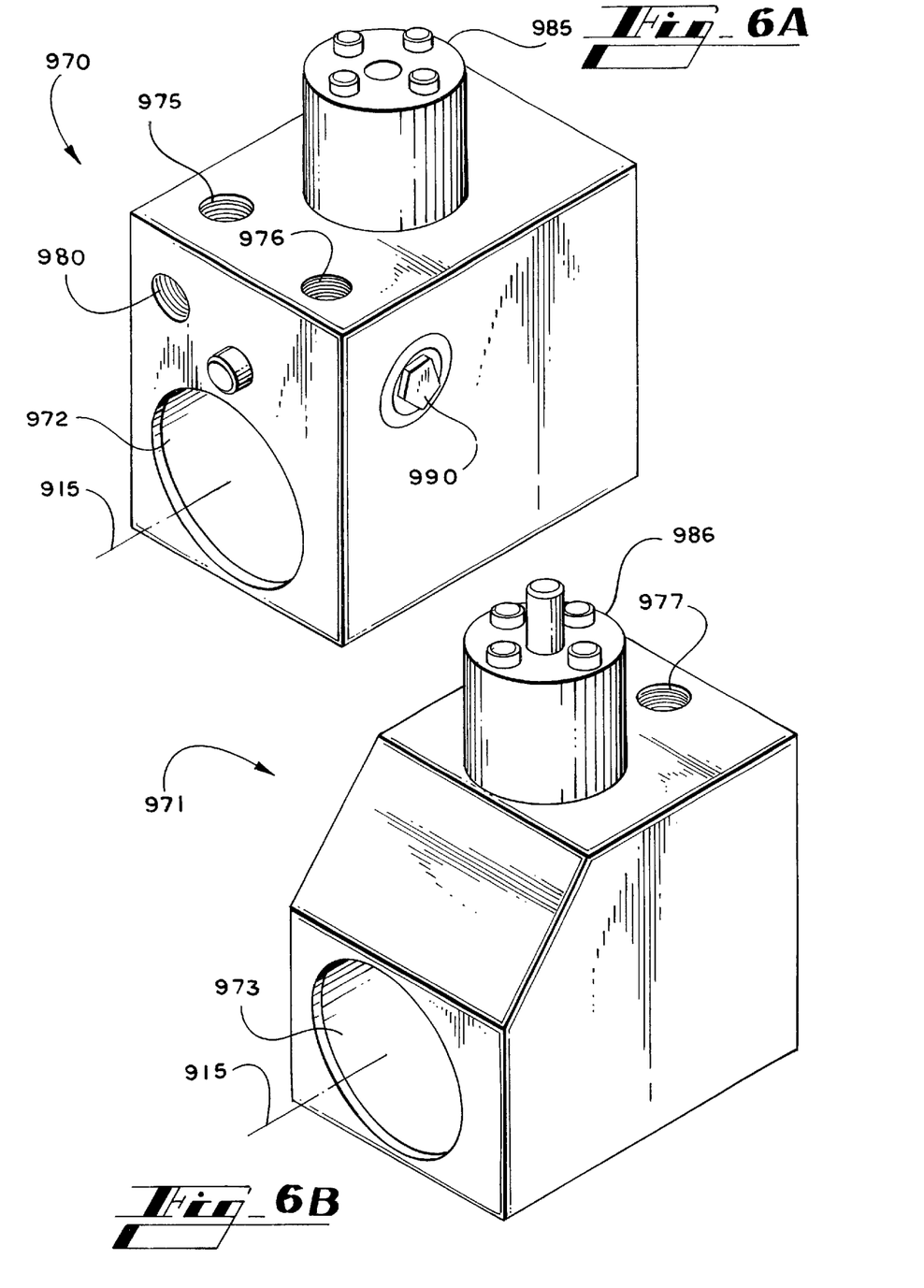
FIG. 6A illustrates an embodiment of a screw shaft head casing.
FIG. 6B illustrates another embodiment of a screw shaft casing.

FIG. 6A illustrates an embodiment of a locking end casing 970. The casing 970 is oriented along a longitudinal axis 915 that is aligned with the longitudinal axis 815 is FIG. 5. As discussed in further detail below, the casing 970 joins with an end of the housing (800 in FIG. 5) to form one integral cylinder. This embodiment of the casing 970 includes two fluid inputs 975, 976 located on a surface of the casing 970.

A plunger housing 985 is located near the inputs 975, 976. An additional fluid input 980 is located on another surface of the casing 970. The input 975 and 980 are connected. An opening 972 is located near the input 980. The casing 970 is adapted to house the locking end (855 in FIG. 5) of the screw shaft (810 in FIG. 5) and the opening 972 is adapted to receive the threaded rod (860 in FIG. 5). The casing 970 further includes a shuttle valve assembly 990. The basic operation of the shuttle valve assembly is to alter fluid flow. The shuttle valve assembly 990 is described in greater detail below.

FIG. 6B illustrates another embodiment of a locking end casing 971 that is described fully with respect to the third embodiment below. This casing 971 is similarly constructed as the casing 970 described above. The casing is oriented along a longitudinal axis that is aligned along the same longitudinal axis as described above. The casing includes a fluid input 977 located near a plunger housing 986. The casing 971 also includes an opening 973 adapted to receive the threaded rod (860 in FIG. 5). The differences with the casing 971 and the casing 970 described above is discussed in further detail below.

Figure 7A:
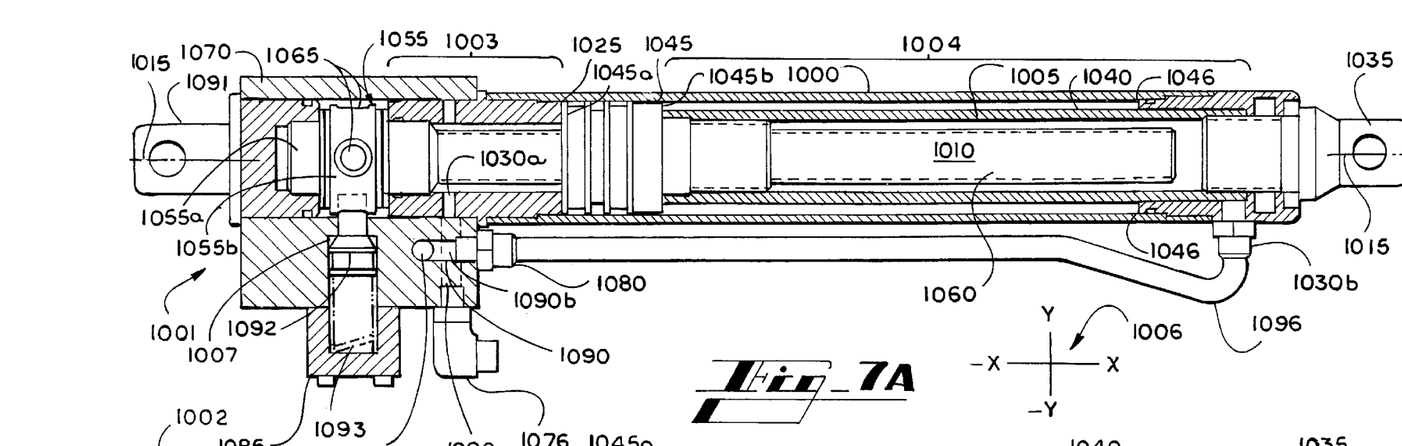
FIG. 7A illustrates a second embodiment of a locking cylinder.

FIG. 7A illustrates a second embodiment of a locking cylinder 1001. A Cartesian coordinate system 1006 is added for simplicity of discussion. FIG. 7A illustrates the housing 1000, the rod/piston assembly 1005 the screw shaft 1060 (800, 805, 810, respectively, of FIG. 5) and the casing 1070 (970 of FIG. 6A) all assembled along the common axis 1015 (815 in FIG. 5, 915 in FIGS. 6A & 6B). The housing 1000 includes a fluid input 1030*b*.

The screw shaft 1060 is adapted to rotate freely within the casing 1070 and the hollow tube 1040 of the rod/piston assembly 1005, as the rod/piston assembly 1005 translates within the housing 1000 while the inner threading (not shown) of the piston 1045 thread on and off the threaded rod 1010. The screw shaft also includes a locking end 1055 having a first cylindrical portion 1055*a* and an outer second cylindrical portion 1055*b*. The second portion 1055*b* also includes a plurality of engagement notches 1065.

The piston wall 1045*a* of piston 1045 is adapted to meet a piston-stop wall 1025 when moving in the −x direction and the piston wall 1045*b* is adapted to meet another piston-stop wall 1046 while moving in the +x direction. Therefore, the rod end 1035 can extend out of and retract into the housing 1000 during these movements as described further below.

The casing 1070 includes a plunger housing 1085 and a shuttle valve assembly 1090 connected to fluid input 1076 (976 in FIG. 6A). FIG. 7A does not illustrate the additional fluid input (975 in FIG. 6A). The shuttle valve assembly 1090 is also connected to this fluid input that is connected to fluid input 1080. The casing 1070 further includes an end cap 1091. The plunger housing 1085 encloses a plunger 1092 and spring 1093. The spring 1093 typically biases the plunger 1092 in a position which engages one of the engagement notches 1065.

The shuttle valve assembly 1090 includes three different fluid conduits 1090*a*, 1090*b*, 1090*c*. One conduit 1090*a* is connected to fluid input 1076 and then further connects with a fluid input 1030*a* on the housing 1000. Another conduit 1090*b* is connected to the fluid input that is not shown (975 in FIG. 6A) and to fluid input 1080. The third conduit 1090*c* is adapted to be connected to either conduit 1090*a* or conduit 1090*b*. Conduit 1090*c* is adapted to provide fluid in the pressure chamber area 1007 around the plunger 1092. A valve (not shown) is used to alter the flow of fluid into conduit 1090*c* from conduit 1090*a* or conduit 1090*b* depending on whether fluid is flowing from input 1075 or input 1080. A further description of this operation is discussed below.

The interior of the cylinder 1001 can be categorized into three pressure chamber areas 1003, 1004, 1007. One chamber area 1003 includes a portion of the interior of the casing 1070 up to the piston wall 1045*a* of the housing 1000. Another chamber 1004 includes the remaining interior of the housing 1000 from the piston wall 1045*b* to the end of the cylinder in the +x direction. The third chamber 1007 includes the area within the plunger housing 1085 on the side of the plunger 1092 without the spring 1093.

Locking Cylinder Operation

Referring still to FIG. 7A and again to FIG. 6A, the locking cylinder 1001 operation is discussed. FIG. 7A illustrates the locking cylinder 1001 with no pressure applied at the fluid ports 1076, 1080 and the port not shown (975 in FIG. 6A). The cylinder 1001 is considered in the fully retracted and neutral position with the rod end 1035 partially retracted into the cylinder housing 1000. In the neutral position with no fluid pressure in the cylinder 1001, the spring 1093 provides a biasing force on the plunger 1092 in the +y direction, thereby keeping the plunger 1092 engaged with one of the notches 1065. The plunger 1092 can be engaged with one of the notches 1065, but in the neutral position it is possible that the plunger 1092 be flush with the portion 1055*b* at a location without a notch 1065. Typically, it is desirable that the plunger 1092 be engaged with one of the notches 1065 to prevent stray rotation of the screw shaft 1060.

Extension Stroke

Referring still to FIG. 7A, in order to extend the rod end 1035, fluid pressure is applied at port 1076. With fluid pressure applied at the port 1076, the valve (not shown) of the shuttle valve assembly 1090 opens the conduits 1090*a*, 1090*c* and closes the conduit 1090*b*. Recall that conduit 1090*b* is connected to the fluid input not shown (975 in FIG. 6A). With conduit 1090*b* closed, no back pressure is asserted into the fluid opening 1080. The fluid pressure routes through conduit 1090*c* into the pressure chamber 1007. The fluid is also routed to fluid input 1030*a* into pressure chamber 1003. The fluid pressure is high enough to extend the rod end 1035 against a load in the +x direction and high enough to overcome the bias force of the spring 1093 and create a net force in the −y direction, thereby removing the plunger 1092 from the notches 1065. With the plunger 1092 removed, the screw shaft 1060 is free to rotate. Furthermore, with the fluid pressure present in pressure chamber 1003 and no pressure in pressure area 1004, there is a net force against the piston wall 1045*a* and thus a net motion of the rod/piston assembly 1005 in the +x direction.

Self-Locking Feature

When the fluid pressure is removed from fluid input 1076, pressure is removed from chambers 1007, 1003. The spring 1093 then biases the plunger 1092 into the neutral position that causes the plunger 1092 to once again engage with one of the notches 1065. Furthermore, the load present on the rod end 1035 pushes back on the rod/piston assembly 1005 in the −x direction. If the plunger 1092 is not aligned with a notch 1065, there is some net rotation of the screw shaft 1060. Typically with four notches 1065 evenly spaced, the shaft 1060 rotates at most a quarter turn that translates to little net rotation back in the −x direction. In other embodiments, there can be fewer or more notches 1065. For example, if there are only two notches 1065 the rotation will be, at most, a half turn.

Retraction Stroke

To retract the rod end 1035, fluid pressure is applied at the fluid input not shown (975 in FIG. 6A). This fluid port is connected to conduit 1090b that in turn connects with fluid input 1080 and in turn with fluid input 1031B via a hose 1096. With fluid pressure applied at the port, the valve (not shown) of the shuttle valve assembly 1090 opens the conduits 1090b, 1090c and closes the conduit 1090a. With conduit 1090a closed, no back pressure is asserted into the fluid opening 1076. The fluid pressure routes through conduit 1090c into the pressure chamber 1007. The fluid is also routed to fluid input 1030b into pressure chamber 1004. The fluid pressure is high enough to retract the rod end 1035 in the −x direction and high enough to overcome the bias force of the spring 1093 and create a net force in the −y direction, thereby removing the plunger 1092 from the notches 1065. With the plunger 1092 removed, the screw shaft 1060 is free to rotate. Furthermore, with the fluid pressure present in pressure chamber 1004 and no pressure in pressure area 1003, there is a net force against the piston wall 1045b and thus a net motion of the rod/piston assembly 1005 in the −x direction. In addition, a load subject to the force of gravity typically adds enough force in the −x direction.

The self locking feature is the same as described above.

A Third Embodiment

Figure 7B:
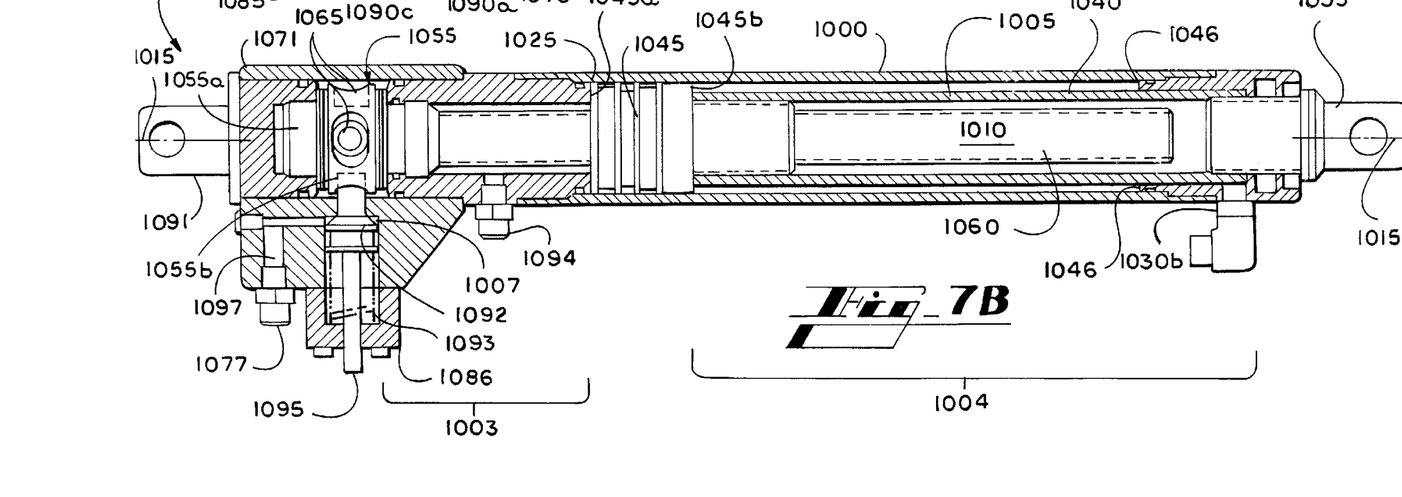
FIG. 7B illustrates a third embodiment of a locking cylinder.

FIG. 5 generally describes the components of the third embodiment. As described above, FIG. 6B illustrates another embodiment of a locking end casing 971 of the third embodiment of a locking cylinder shown in FIG. 7B. The Cartesian coordinate system 1006 is added for simplicity of discussion. FIG. 7B illustrates the housing 1000, the rod/piston assembly 1005 the screw shaft 1060 (800, 805, 810, respectively, of FIG. 5) and the casing 1071 (971 of FIG. 6B) all assembled along the common axis 1015 (815 in FIG. 5, 915 in FIG. 6A). The housing 1000 includes fluid inputs 1030b, 1094.

The screw shaft 1060 is adapted to rotate freely within the casing 1071 and the hollow tube 1040 of the rod/piston assembly 1005, as the rod/piston assembly 1005 translates within the housing 1000 while the inner threading (not shown) of the piston 1045 thread on and off the threaded rod 1010. The screw shaft 1060 also includes a locking end 1055 having a first cylindrical portion 1055a and an outer second cylindrical portion 1055b. The second portion 1055b also includes a plurality of engagement notches 1065.

The piston wall 1045a of piston 1045 is adapted to meet a piston-stop wall 1025 when moving in the −x direction and the piston wall 1045b is adapted to meet another piston-stop wall 1046 while moving in the +x direction. Therefore, the rod end 1035 can extend out of and retract into the housing 1000 during these movements as described further below.

The casing 1071 includes a plunger housing 1086. In this embodiment of the locking cylinder 1002, an additional rod 1095 is included in the plunger housing 1086. A fluid input 1077 (977 in FIG. 6B) is located near the plunger housing 1086. The casing 1071 further includes an end cap 1091. The plunger housing 1086 encloses a plunger 1092 and spring 1093. The plunger 1092 is adapted to travel along the rod 1095 in the +y and −y directions. The spring 1093 typically biases the plunger 1092 in a position which engages one of the engagement notches 1065.

The interior of the cylinder 1002 can be categorized into three pressure chamber areas 1003, 1004, 1007. One chamber area 1003 includes a portion of the interior of the casing 1071 up to the piston wall 1045a of the housing 1000. Another chamber 1004 includes the remaining interior of the housing 1000 from the piston wall 1045b to the end of the cylinder in the +x direction. The third chamber 1007 includes the area within the plunger housing 1086 on the side of the plunger 1092 without the spring 1093.

Locking Cylinder Operation

Referring still to FIG. 7B and again to FIG. 6B, the locking cylinder 1002 operation is discussed. FIG. 7B illustrates the locking cylinder 1002 with no pressure applied at the fluid ports 1030b, 1077, 1094. The cylinder 1002 is considered in the fully retracted and neutral position with the rod end 1035 partially retracted into the cylinder housing 1000. In the neutral position with no fluid pressure in the cylinder 1002, the spring 1093 provides a biasing force on the plunger 1092 in the +y direction, thereby keeping the plunger 1092 engaged with one of the notches 1065. The plunger 1092 can be engaged with one of the notches 1065, but in the neutral position it is possible that the plunger 1092 be flush with the portion 1055b at a location without a notch 1065. Typically, it is desirable that the plunger 1092 be engaged with one of the notches 1065 to prevent stray rotation of the screw shaft 1060.

Extension Stroke

Referring still to FIG. 7B, in order to extend the rod end 1035, fluid pressure is applied at port 1094 which pressurizes pressure chamber 1003. Fluid pressure is also applied at fluid input 1077 which pressurizes pressure chamber 1007. The fluid pressure in chamber 1003 is high enough to extend the rod end 1035 against a load in the +x direction. The pressure in chamber 1007 is high enough to overcome the bias force of the spring 1093 and create a net force in the −y direction, thereby removing the plunger 1092 from the notches 1065. With the plunger 1092 removed, the screw shaft 1060 is free to rotate. Furthermore, with the fluid pressure present in pressure chamber 1003 and no pressure in pressure area 1004, there is a net force against the piston wall 1045a and thus a net motion of the rod/piston assembly 1005 in the +x direction.

Self-Locking Feature

When the fluid pressure is removed from fluid input 1077, pressure is removed from chamber 1007. The spring 1093 then biases the plunger 1092 into the neutral position that causes the plunger 1092 to once again engage with one of the notches 1065. Typically pressure is also removed from chamber 1003. Furthermore, the load present on the rod end 1035 pushes back on the rod/piston assembly 1005 in the −x direction. If the plunger 1092 is not aligned with a notch 1065, there is some net rotation of the screw shaft 1060. Typically with four notches 1065 evenly spaced, the shaft 1060 rotates at most a quarter turn that translates to little net rotation back in the −x direction. If there are only two notches there is only, at most, a half turn. Even in the event that pressure is not removed from chamber 1003 that makes the rod/piston assembly 1005 continue to assert a force against a load on the rod end 1035 and create a motion in the +x direction, the self-locking feature prevents rotation of the screw shaft 1005 and therefore any motion in the +x direction.

Retraction Stroke

To retract the rod end 1035, fluid pressure is applied at the fluid input 1030b that pressurizes chamber 1004. Fluid pressure is also applied at port 1077 that pressurizes chamber 1007. The fluid pressure in chamber 1004 is high enough to retract the rod end 1035 in the −x direction. The pressure in chamber 1007 is high enough to overcome the bias force of the spring 1093 and create a net force in the −y direction, thereby removing the plunger 1092 from the notches 1065.

With the plunger 1092 removed, the screw shaft 1060 is free to rotate. Furthermore, with the fluid pressure present in pressure chamber 1004 and no pressure in pressure area 1003, there is a net force against the cylinder wall 1045b and thus a net motion of the rod/piston assembly 1005 in the −x direction. In addition, a load subject to the force of gravity typically adds enough force in the −x direction.

The self locking feature is the same as described above.

Several embodiments have been described above. Embodiments of a locking cylinder has been described with use in a car trailer. It is understood that the locking cylinder can be used in a variety of other embodiments requiring a hydraulic cylinder. For example, locking cylinders can be used for a mechanic's hydraulic car lift or other similar mechanisms.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A locking cylinder, comprising:
   a screw shaft having a head and a threaded rod, wherein the head has a radius larger than the rod, the head having a top surface;
   a nut in threaded engagement with the threaded rod;
   a piston, having a hollow center, connected to the nut, the piston being adapted to receive the threaded rod when the nut screws onto the screw shaft;
   a substantially cylindrical rod, with one end connected to the piston, wherein the screw shaft, the nut, the piston, and the rod share a longitudinal axis, wherein the top surface of the head is substantially perpendicular to the longitudinal axis; and
   a generally cylindrical housing surrounding the screw shaft, the nut, the piston and the rod, wherein the rod extends out of one end of the housing along the longitudinal axis, wherein the longitudinal axis of the housing is the same as the longitudinal axis, wherein one end of the housing has an inner wall with a radius substantially the same as a radius of the rod, and wherein an elongated portion of the center of the housing has an inner wall with a radius substantially the same as a radius of the piston, and wherein the other end of the housing has an inner wall with a radius substantially the same as the head of the screw shaft.

2. The cylinder as claimed in claim 1, wherein the perimeter of the head of the screw shaft is in contact with the inner wall of the housing having the radius the same as the head, and wherein the perimeter of the piston is in contact with the inner wall of the housing having the same radius as the piston, and wherein the perimeter of the rod is in contact with the inner wall of the housing having the same radius as the rod.

3. The cylinder as claimed in claim 2 further comprising:
   a first seal in the inner wall of the housing having the same radius as the head, the seal running along the perimeter of the head, and in contact with the head;
   a second seal running along the perimeter of the piston and in contact with the inner wall having the same radius as the piston; and
   a third seal in the inner wall of the housing having the same radius as the rod, the third seal running along the perimeter of the rod, and in contact with the rod.

4. A locking cylinder, comprising:
   a screw shaft having a head and a threaded rod, wherein the head has a radius larger than the rod, the head having a top surface;
   a nut in threaded engagement with the threaded rod;
   a piston, having a hollow center, connected to the nut, the piston being adapted to receive the threaded rod when the nut screws onto the screw shaft;
   a substantially cylindrical rod, with one end connected to the piston, wherein the screw shaft, the nut, the piston, and the rod share a longitudinal axis, wherein the top surface of the head is substantially perpendicular to the longitudinal axis;
   a generally cylindrical housing surrounding the screw shaft, the nut, the piston and the rod, wherein the rod extends out of one end of the housing along the longitudinal axis, wherein the longitudinal axis of the housing is the same as the longitudinal axis;
   wherein the end of the housing opposite the end of the housing having the rod extending from it, has a closure, the closure having an inner wall internal to the housing, and substantially perpendicular to the longitudinal axis;
   wherein the inner wall of the closure faces the top surface of the head; and
   wherein the top surface of the head further comprises a notch at a location on the surface less than the radius of the head.

5. The cylinder as claimed in claim 4 further comprising a locking rod substantially connected to the inner wall of the closure and perpendicular to the inner wall of the closure, the locking rod adapted to engage the notch.

6. A hydraulic cylinder, comprising:
   a substantially cylindrical housing having a longitudinal axis and a first and second end, the first end having an inner face and an outer face, the inner and outer faces being substantially perpendicular to the longitudinal axis, and the second end having an opening defined by a plane substantially perpendicular to the longitudinal axis;
   a screw shaft having:
      a substantially cylindrical head portion having a first radius;
      a substantially cylindrical threaded portion having a second radius, the threaded portion being substantially perpendicular with a geometric cross section of the head portion, wherein the head portion and the threaded portion have a longitudinal axis common with the longitudinal axis of the housing, and wherein the geometric cross section is substantially perpendicular with the common longitudinal axes;
   a rod having:
      a substantially cylindrical ball nut having a first and second open end, and an inner and outer surface, the inner surface being threaded and adapted to engage the threaded portion of the screw shaft;
      a substantially cylindrical piston having a first end and a second end, the first end being connected to one of the ball nut ends;
      an end portion connected to the second end of the piston, wherein the end portion intersects the opening defined by the plane on the second end of the housing, wherein the ball nut, the piston and the end portion have a longitudinal axis common with the longitudinal axis of the housing; and
   a locking rod substantially perpendicular to the inner face of the first end of the housing.

7. The cylinder of claim 6 further comprising hydraulic fluid inputs.

8. A vehicle transporter, comprising:

a plurality of vehicle platforms, each having a plurality of hydraulic cylinders to life and position the platforms, the cylinders comprising:
- a substantially cylindrical housing having a longitudinal axis and a first and second end, the first end having an inner face and an outer face, the inner and outer faces being substantially perpendicular to the longitudinal axis, and the second end having an opening defined by a plane substantially perpendicular to the longitudinal axis;
- a screw shaft having:
  - a substantially cylindrical head portion having a first radius;
  - a substantially cylindrical threaded portion having a second radius, the threaded portion being substantially perpendicular with a geometric cross section of the head portion, wherein the head portion and the threaded portion have a longitudinal axis common with the longitudinal axis of the housing, and wherein the geometric cross section is substantially perpendicular with the common longitudinal axes;
- a rod having:
  - a substantially cylindrical ball nut having a first and second open end, and an inner and outer surface, the inner surface being threaded and adapted to engage the threaded portion of the screw shaft;
  - a substantially cylindrical piston having a first end and a second end, the first end being connected to one of the ball nut ends;
  - an end portion connected to the second end of the piston, wherein the end portion intersects the opening defined by the plane on the second end of the housing, wherein the ball nut, the piston and the end portion have a longitudinal axis common with the longitudinal axis of the housing; and
  - a locking rod substantially perpendicular to the inner face of the housing.

9. A locking cylinder, comprising:
- a screw shaft having a head and a threaded rod, wherein the head has a radius larger than the rod, the head having a circumferential surface;
- a piston, having a hollow center and internal threads, the piston being adapted to receive the threaded rod when the internal threads screw onto the screw shaft;
- a substantially cylindrical rod, with one end connected to the piston, wherein the screw shaft, the piston, and the rod share a longitudinal axis;
- a generally cylindrical housing surrounding the screw shaft, the piston and the rod, wherein the rod extends out of one end of the housing along the longitudinal axis, wherein the longitudinal axis of the housing is the same as the longitudinal axis; and
- a casing connected to the housing and enclosing the head of the screw shaft, the casing including a plunger enclosed within a chamber within the casing and oriented substantially perpendicular to the longitudinal axis and to a portion of the circumferential surface, a first end of the plunger in a proximity of the circumferential surface and a spring coupled to the second end of the plunger.

10. The cylinder as claimed in claim 9, wherein the circumferential surface includes at least one engagement notch oriented radially outward from the circumferential surface, wherein the notch is adapted to receive the first end of the plunger.

11. The cylinder as claimed in claim 9 further comprising hydraulic fluid inputs.

12. The cylinder as claimed in claim 9, wherein the casing further includes a shuttle valve assembly having hydraulic fluid inputs, the assembly adapted to route hydraulic fluid to different sections of the housing and to the portion of the casing having the plunger.

13. The cylinder as claimed in claim 9, wherein the casing further includes a hydraulic fluid input adapted to route fluid to the portion of the casing having the plunger.

14. A vehicle transporter, comprising:
- a plurality of vehicle platforms, each having a plurality of hydraulic cylinders to lift and position the platforms, the cylinders comprising:
  - a screw shaft having a head and a threaded rod, wherein the head has a radius larger than the rod, the head having a circumferential surface;
  - a piston, having a hollow center and internal threads, the piston being adapted to receive the threaded rod when the internal threads screw onto the screw shaft;
  - a substantially cylindrical rod, with one end connected to the piston, wherein the screw shaft, the piston, and the rod share a longitudinal axis;
  - a generally cylindrical housing surrounding the screw shaft, the piston and the rod, wherein the rod extends out of one end the housing along the longitudinal axis, wherein the longitudinal axis of the housing is the same as the longitudinal axis; and
  - a casing connected to the housing and enclosing the head of the screw shaft, the casing including:
    - a plunger enclosed within a chamber within the casing and oriented substantially perpendicular to the longitudinal axis and to a portion of the circumferential surface, a first end of the plunger in proximity of the circumferential surface; and
    - a spring coupled to a second end of the plunger, wherein the circumferential surface includes at least one engagement notch oriented radially outward from the circumferential surface, wherein the notch is adapted to receive the first end of the plunger.

* * * * *